United States Patent
Tomiyama et al.

(10) Patent No.: US 6,515,058 B1
(45) Date of Patent: Feb. 4, 2003

(54) POLYAMIDE RESIN COMPOSITION

(75) Inventors: Hiroshi Tomiyama, Kanagawa (JP); Shinya Matsumoto, Miyazaki (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/634,296

(22) Filed: Aug. 9, 2000

(51) Int. Cl.⁷ .............................. C08J 5/10; C08K 5/09; C08L 77/00
(52) U.S. Cl. .................. 524/322; 524/320; 524/321; 524/317; 524/318
(58) Field of Search ................................ 524/301, 320, 524/321, 322, 317, 318

(56) References Cited

U.S. PATENT DOCUMENTS 4,500,665 A * 2/1985 Brecker et al. ............. 524/227
5,929,200 A    7/1999 Pagilagan

FOREIGN PATENT DOCUMENTS

| JP | 619016 B2   | 3/1994  |
| JP | 6340807 A   | 12/1994 |
| JP | 770433 A    | 3/1995  |
| JP | 751633 B2   | 6/1995  |
| JP | 7228770 A   | 8/1995  |
| JP | 9235464 A   | 9/1997  |
| JP | 11217498 A  | 8/1999  |
| JP | 11226946 A  | 8/1999  |
| JP | 11228815 A  | 8/1999  |
| JP | 11228816 A  | 8/1999  |

* cited by examiner

Primary Examiner—James J. Seidleck
Assistant Examiner—U. K. Rajguru
(74) Attorney, Agent, or Firm—Birch Stewart Kolasch & Birch LLP

(57) ABSTRACT

Polyamide resin pellets which comprise: 100 parts by weight of a polyamide resin; from 0.01 to 1.0 part by weight of lubricant A, which comprises at least one ester of a higher aliphatic carboxylic acid with a higher alcohol; and from 0.01 to 1.0 part by weight of lubricant B. which comprises at least one higher aliphatic carboxylic acid metal salt, wherein lubricant A is present inside the pellets. Also disclosed are the polyamide resin pellets further comprising lubricant C, which comprises a higher aliphatic carboxylic acid amide.

14 Claims, No Drawings

POLYAMIDE RESIN COMPOSITION

FIELD OF THE INVENTION

The present invention relates to polyamide resin composition pellets for molding, e.g., injection molding, and to a process for producing the same. More particularly, the invention relates to a polyamide resin composition and pellets thereof having excellent workability, e.g., releasability and plasticity, under a wide range of injection molding conditions and having excellent color tone quality.

DESCRIPTION OF THE RELATED ART

Polyamide resins, especially polyamide 66 resins, are extensively used as injection-molded articles such as connectors and tying bands because of their excellent mechanical properties. In recent years, injection-molded articles having a complicated shape are required and there also is a desire for the fast-cycle production of these articles under various molding conditions.

For example, some molding techniques employ a relatively low cylinder temperature near the melting point of the polymer, while others employ a cylinder temperature as high as 350° C. With respect to mold temperature, some techniques use a mold temperature controller to conduct molding at a mold temperature as low as room temperature or below, while others employ a mold temperature as high as 100° C. or above.

Important means for raising productivity in injection molding are to improve the releasability of molded articles from the molds and to shorten the time required for plasticization. The technique generally used for attaining these properties is to add various additives to pellets. Examples of lubricants for use in polyamide resins include higher fatty acids, metal salts of higher fatty acids, esters of higher fatty acids, and higher fatty acid bisamides.

However, use of any one of these lubricants only improves releasability in a specific narrow mold temperature range and plasticity in a specific narrow cylinder temperature range, and it is difficult in injection molding to simultaneously satisfy releasability in a wide mold temperature range of from a low to a high temperature and plasticity in a wide cylinder temperature range of from a low to a high temperature.

JP-A-7-228770 (the term "JP-A" as used herein means an "unexamined published Japanese patent application") discloses a technique in which a combination of a higher fatty acid metal salt and a higher fatty acid ester is attached to the surface of pellets. Use of these lubricants in combination is effective in improving releasability in a wider mold temperature range than in the case of using a single lubricant. However, the technique in which lubricants are merely attached to the pellet surface as in the disclosed technique has an unsolved problem that releasability is apt to fluctuate because of the unevenness of the amount of the lubricants attached to the surface and detachment of the attached lubricants from the surface. Furthermore, especially in molding with a high temperature melting, the technique described above causes a problem that a longer time is required for plasticization upon injection molding, resulting in reduced productivity, etc. The reason for this problem may be that in the case where pellets having a higher fatty acid ester attached to the pellet surface are fed to a high-temperature cylinder, the lubricant present on the pellet surface melts to cause the pellets to fuse to one another and thereby inhibit the pellets from smoothly moving in the cylinder.

U.S. Pat. No. 5,929,200 discloses a technique in which various carboxylic acid salts are incorporated into a polyamide melt during a polymerization process for polyamide production. However, salts of lower aliphatic carboxylic acids are almost ineffective in improving the moldability of polyamides, while salts of higher aliphatic carboxylic acids, when used alone, are insufficient for attaining a wide range of molding conditions, which attainment is included in the objects of the invention.

JP-B-6-19016 (the term "JP-B" as used herein means an "examined Japanese patent publication") discloses a technique in which a phosphorous ester, a higher fatty acid metal salt having 10 to 25 carbon atoms, and a higher fatty acid ester are incorporated into a polyamide through kneading with an extruder. Indeed, this composition has improved releasability and further retains impact strength. However, the addition of a nucleating agent such as the phosphorous ester is apt to cause problems that the composition gives a molded article which has a reduced elongation and is brittle and that the viscosity of the polyamide becomes unstable.

JP-A-9-235464 discloses a technique in which an ester of a higher fatty acid with a lower dihydric alcohol is used. However, in the case of using this aliphatic carboxylic acid ester, it is difficult to satisfy releasability under a wide range of mold temperature conditions although releasability in a specific temperature range is improved.

SUMMARY OF THE INVENTION

An object of the invention is to provide polyamide resin pellets which have improved releasability and reduced fluctuations thereof, both in a wide mold temperature range, even without adding a nucleating agent, have improved plasticity characteristics in a wide cylinder temperature range, and further have excellent color tone quality, so as to cope with the recent needs of the market for improved moldability required of polyamide resins.

Other objects and effects of the present invention will become apparent from the following description.

As a result of extensive investigations, the present inventor has found that those problems can be eliminated by using a specific combination of lubricants and incorporating a specific one of these lubricants inside pellets.

Specifically, the above-described objects of the present invention have been achieved by providing the following polyamide pellets.

1. Polyamide resin pellets which comprise:

100 parts by weight of a polyamide resin;

from 0.01 to 1.0 part by weight of lubricant A, which comprises at least one ester of a higher aliphatic carboxylic acid with a higher alcohol; and from 0.01 to 1.0 part by weight of lubricant B, which comprises at least one higher aliphatic carboxylic acid metal salt, wherein said lubricant A is present inside the pellets.

2. The polyamide resin pellets of claim 1, wherein said lubricant B is a metal salt of a higher aliphatic carboxylic acid having 26 to 30 carbon atoms.

3. The polyamide resin pellets of claim 2, wherein lubricant B is attached to the surface of the pellets.

4. The polyamide resin pellets of claim 1, wherein said lubricant B comprises at least two higher aliphatic carboxylic acid metal salts, at least one of which is attached to the surface of the pellets.

5. Polyamide resin pellets which comprise:

100 parts by weight of a polyamide resin;

from 0.01 to 1.0 part by weight of lubricant A, which comprises at least one ester of a higher aliphatic carboxylic acid with a higher alcohol;

from 0.01 to 1.0 part by weight of lubricant B, which comprises at least one higher aliphatic carboxylic acid metal salt; and from 0.01 to 1.0 part by weight of lubricant C, which comprises a higher aliphatic carboxylic acid amide, wherein said lubricant A is present inside the pellets.

6. The polyamide resin pellets of claim 5, wherein said lubricant B comprises at least two higher aliphatic carboxylic acid metal salts, at least one of which is attached to the surface of the pellets.

7. The polyamide resin pellets of claim 5, wherein said lubricant A is an ester of an aliphatic carboxylic acid having 15 to 21 carbon atoms.

8. The polyamide resin pellets of claim 6, wherein said lubricant A is an ester of an aliphatic carboxylic acid having 15 to 21 carbon atoms.

9. The polyamide resin pellets of claim 5, wherein said lubricant C is a saturated fatty acid amide.

10. The polyamide resin pellets of claim 6, wherein said lubricant C is a saturated fatty acid amide.

11. The polyamide resin pellets of claim 7, wherein said lubricant C is a saturated fatty acid amide.

12. The polyamide resin pellets of claim 6, wherein said lubricant B that is attached to the pellet surface is a metal salt of a higher fatty acid having 15 to 30 carbon atoms.

13. The polyamide resin pellets of claim 8, wherein said lubricant B that is attached to the pellet surface is a metal salt of a higher fatty acid having 15 to 30 carbon atoms.

14. The polyamide resin pellets of claim 13, wherein said lubricant C is a saturated fatty acid amide.

DETAILED DESCRIPTION OF THE INVENTION

Known polyamide resins can be used as the polyamide resin for use in the invention. Examples thereof include polyamide 66, polyamide 610, polyamide 612, polyamide 46, and polyamide 1212, each obtained by the polycondensation of a diamine with a dicarboxylic acid, and further include polyamide 6 and polyamide 12, each obtained by the ring-opening polymerization of a lactam. Examples thereof furthermore include polyamide copolymers such as polyamide 66/6, polyamide 66/610, polyamide 66/612, polyamide 66/6T (T represents terephthalic acid ingredient), polyamide 66/6I (I represents isophthalic acid ingredient), and polyamide 6T/6I. Blends of these polyamide resins are also included in the examples. These polyamide resins may be produced by a generally employed known method. Although a melt polymerization process is generally used for the polyamide production, it may be conducted either batchwise or continuously.

In producing the polyamide resin composition pellets of the invention, a plurality of the specific lubricants described below are added.

Lubricant A, the first lubricant essential to the invention, is an ester of a higher aliphatic carboxylic acid with a higher alcohol. Examples of the higher aliphatic carboxylic acid include fatty acids having 6 to 30 carbon atoms, such as capric acid, lauric acid, myristic acid, palmitic acid, stearic acid, arachic acid, behenic acid, lignoceric acid, cerotic acid, montanic acid, melissic acid, undecylenic acid, oleic acid, elaidic acid, cetoleic acid, erucic acid, brassidic acid, linoleic acid, linolenic acid, arachidonic acid, and stearolic acid. Examples of the higher alcohol include monohydric aliphatic alcohols having 6 to 30 carbon atoms. Preferred examples thereof include hexyl alcohol, octyl alcohol, lauryl alcohol, stearyl alcohol, behenyl alcohol, and oleyl alcohol. The lower alcohols and lower glycols each having 5 or less carbon atoms are undesirable because they are less effective in improving releasability. Esters of those higher aliphatic carboxylic acids with those higher alcohols are used. Examples of such esters include stearyl stearate, which is the ester of stearic acid with stearyl alcohol, and behenyl behenate, which is the ester of behenic acid with behenyl alcohol. Preferred of such esters are esters of aliphatic carboxylic acids having 15 to 21 carbon atoms. This is because esters of aliphatic carboxylic acids having 15 to 21 carbon atoms, during injection molding, are present in a liquid state on the mold surface and hence show improved release properties. Two or more kinds of lubricants A may be used in combination as needed.

Lubricant B, the second lubricant essential to the invention, is a metal salt of a higher aliphatic carboxylic acid. Examples of the higher aliphatic carboxylic acid include fatty acids having 6 to 30 carbon atoms, such as capric acid, lauric acid, myristic acid, palmitic acid, stearic acid, arachic acid, behenic acid, lignoceric acid, cerotic acid, montanic acid, melissic acid, undecylenic acid, oleic acid, elaidic acid, cetoleic acid, erucic acid, brassidic acid, linoleic acid, linolenic acid, arachidonic acid, and stearolic acid. Examples of the metal in the metal salt include alkali metals such as sodium and potassium, alkaline earth metals such as calcium and magnesium, aluminum, zinc, manganese, and nickel.

Two or more kinds of lubricants B may be used in combination as needed. To enhance the releasability and plasticity, it is preferred that at least one lubricants B is attached to the pellet surface. The carbon number of lubricant B that is attached to the pellet surface is preferably from 15 to 30, and particularly preferably from 26 to 30, for further improving the releasability and for remarkably improving plasticity at a relatively low cylinder temperature around the melting point of the polyamide.

Lubricant A and lubricant B can be incorporated into or added to a polyamide resin by the following methods.

In the invention, it is essential that lubricant A be incorporated inside polyamide resin pellets. Lubricant A (fatty acid ester) generally has a lower melting point than lubricant B (fatty acid salt) Therefore, if pellets having lubricant A attached to the surface thereof are fed to a high-temperature cylinder, this lubricant present on the pellet surface melts to cause the pellets to fuse to one another and thereby inhibit the pellets from smoothly moving in the cylinder. This causes a problem that the plasticization time is prolonged.

There are several methods for enabling lubricant A to be present inside the polyamide resin pellets.

In one method, lubricant A is first heated to or above the melting point thereof and this melt is injected into a molten polymer during a polymerization process for polyamide production, whereby the lubricant can be present inside the resultant pellets. The temperature at which the lubricant is melted is preferably as low as possible from the standpoint of preventing lubricant pyrolysis. A preferred range of the temperature at which lubricant A is melted is from the melting point of the lubricant to the temperature higher than the melting point by 100° C., and a more preferred range thereof is from the melting point of the lubricant to the temperature higher than the melting point by 50° C. For the injection, a feed pump such as, e.g., a gear pump or plunger pump is used to inject the molten liquid lubricant into the molten polymer in a polymerization line for polyamide production by means of side injection. In this case, it is preferred to dispose a line mixer, e.g., a static mixer, in the piping because the lubricant can be efficiently dispersed into the polyamide polymer by the mixer. In a polyamide production process in which an aqueous salt solution as a starting material is subjected to polymerization, a large amount of water is generally present in the reaction system in the initial stage of polymerization and, hence, addition of the molten lubricant in this stage of polymerization is apt to result in separation of the lubricant from the aqueous salt solution. It is therefore preferred to inject the lubricant in a later stage of the polymerization process. After the addition of the lubricant, the molten polymer is extruded into strands through orifices and the strands are cut into pellets. Thus, polyamide resin pellets containing the lubricant can be obtained.

Another method comprises mixing the lubricant with pellets of a polyamide resin for which polymerization has been completed and then melt-kneading the resultant mixture again with an extruder to obtain pellets containing the lubricant.

From the standpoints of the precision of lubricant addition, color tone of pellets, and productivity, the method in which lubricant addition is conducted during polymerization for polyamide production is preferred.

Lubricant B as the second lubricant essential to the invention may be attached to the surface of the polyamide resin pellets containing lubricant A, or may be added during polymerization for polyamide production like lubricant A.

Methods which can be used for attaching lubricant B to the surface of pellets include a method in which the lubricant in a powder form is attached as it is by batch blending with a cone blender or continuous blending with a ribbon blender and a method in which the pellet surface is coated with the lubricant with a Henschel mixer or the like. The former method may be conducted in such a manner that polyamide pellets are first introduced into the blender and then sprinkled with a spreading agent, e.g., polyethylene glycol or a polyoxyethylene-sorbitan/fatty acid ester, as an addition aid, before lubricant B is added and mixed therewith. This method is preferred in that lubricant B can be satisfactorily attached to the pellet surface. By attaching lubricant B to the pellet surface, plasticity is especially improved significantly in injection molding employing a relatively low cylinder temperature near the melting point of the polyamide.

On the other hand, the method in which lubricant B is added during polymerization for polyamide production may be conducted in such a manner that lubricant B is first heated, like lubricant A, to obtain a melt and this melt is added to the polymerization system with a pump at the time when the water content in the system has decreased to 10% or lower.

In the case where both lubricant A and lubricant B are injected during a polymerization process, the two lubricants may be separately melted and added. Alternatively, the two lubricants may be mixed with each other, subsequently melted, and then added as a mixture. The method in which the lubricants are mixed before being melted and added is preferred because it necessitates simpler facilities.

The addition amount of lubricant A and that of lubricant B each is from 0.01 to 1.0 part by weight per 100 parts by weight of the polyamide resin. Addition amounts thereof smaller than 0.01 part by weight result in an insufficient releasing effect, while addition amounts thereof larger than 1.0 part by weight cause problems, for example, that the viscosity of the composition upon molding is deteriorated and that the molded article is apt to have silver streaks. The preferred range of the addition amount of each lubricant is from 0.03 to 0.5 parts by weight.

The following has been found. In the case where the method comprising mixing lubricant A with lubricant B beforehand, heating the mixture, and then adding the resultant melt during a polymerization process for polyamide production is used, the lubricants produce an effect of lowering melting points when used as a three-component lubricant system comprising the combination of the lubricants A and B and further a specific higher aliphatic carboxylic acid amide (lubricant C) as the third lubricant, to thereby enable melting at lower temperatures. Consequently, use of this lubricant system leads to a reduction in the cost of heating energy for melting and, hence, it is preferred to use lubricants A and B in combination with lubricant C. Furthermore, it has surprisingly been found that the addition of lubricant C is effective in giving molded articles of excellent quality having improved transparency.

Lubricant C is an amide of a fatty acid having 6 to 30 carbon atoms. Examples thereof include the monoamides and bisamides of capric acid, lauric acid, myristic acid, palmitic acid, stearic acid, arachic acid, behenic acid, lignoceric acid, cerotic acid, montanic acid, melissic acid, undecylenic acid, oleic acid, elaidic acid, cetoleic acid, erucic acid, brassidic acid, linoleic acid, linolenic acid, arachidonic acid, and stearolic acid. Preferred examples thereof include saturated fatty acid monoamides such as stearamide and behenamide, unsaturated fatty acid monoamides such as erucamide and oleamide, and fatty acid bisamides such as ethylenebis (stearamide).

The addition amount of lubricant C is from 0.01 to 1.0 part by weight per 100 parts by weight of the polyamide resin. Addition amounts thereof smaller than 0.01 part by weight result in an insufficient effect in lowering the temperature for melting, while addition amounts thereof larger than 1.0 part by weight cause problems, for example, that the viscosity of the composition upon molding is deteriorated and that the molded article is apt to have silver streaks. The preferred range of the addition amount thereof is from 0.03 to 0.5 parts by weight.

The addition of the lubricants described above to a polyamide may be conducted in such a manner that a mixture of these lubricants is prepared beforehand and melted by heating and this melt is added to a polyamide melt in a polymerization process with a feed pump such as those shown above. This addition method is advantageous in that the lubricants can be highly evenly mixed together and the addition amounts thereof can be controlled exceedingly precisely. Because of this, resin pellets having reduced fluctuations of lubricant content and stable moldability can be produced as compared with the case where lubricants are merely attached to the surface of pellets or where pellets are kneaded together with lubricants by means of an extruder.

The polyamide resin composition pellets of the invention may contain known substances according to need. Examples of such optional ingredients include polymerization catalysts such as phosphorus compounds, e.g., hypophosphorous acid salts, phosphorous acid salts, and phosphoric acid salts, nucleating agents such as phosphorous esters and phenylphosphonic acid salts, polymerization degree regulators such as acetic acid, heat stabilizers such as copper acetate, copper iodide, potassium iodide, and potassium bromide, fillers such as talc, kaolin, and wollastonite, reinforcements such as glass fibers and carbon fibers, and light stabilizers such as ultraviolet absorbers and HALS.

EXAMPLES

The present invention will be illustrated in greater detail by reference to the following Examples and Comparative Examples, but the invention should not be construed as being limited thereto. In Example 1, injection molding was conducted by the method shown below to evaluate moldability in terms of releasability and plasticity and further evaluate molded-article quality in terms of color tone and transparency.

(1) Releasability

Molded articles in a cup form were produced. A mold equipped with a release force measuring apparatus having a load cell attached to the ejector pin for molded articles was used to conduct molding under the following conditions. With respect to fifty shots, the release forces were measured and the average and fluctuation thereof were calculated. The difference between the maximum and minimum found values of release force was taken as the fluctuation.

- Injection molding machine: IS-90B, manufactured by Toshiba Machine Co., Ltd.
- Mold: for cup-form molded articles having an outer diameter of 50 mm, height of 50 mm, and wall thickness of 1 mm
- Set cylinder temperature: 280° C.
- Mold temperature: 100° C. for high-mold-temperature evaluation or 30° C. for low-mold-temperature evaluation
- Injection pressure: 400 kg/cm$^2$
- Injection speed: 30%
- Injection time: 7 sec
- Cooling time: 20 sec (2) Plasticity Molding was conducted in the same manner as in the evaluation of releasability, except that the following conditions were used. The time required for the screw to recede upon plasticization was measured, and the average of the plasticization times for fifty shots was determined.

- Set cylinder temperature: 320° C. for evaluation for high-temperature plasticization or 270° C. for evaluation for low-temperature plasticization
- Mold temperature: 100° C.

(3) Color Tone of Molded Article

The quality (color tone) of a molded article obtained in the evaluation of releasability (1) (mold temperature, 100° C.) was determined by the following method.

- Colorimeter: ND-300A, manufactured by Nippon Denshoku Kogyo K.K.

The bottom of the molded article was examined for the values of L, a, and b in a reflection measurement, and the yellowness was evaluated in terms of the value of b. A larger positive value of b indicates that the molded article has a yellower tone and is defective.

(4) Transparency of Molded Article

The transparency of a molded article obtained in the evaluation of releasability (1) (mold temperature, 30° C.) was evaluated. The bottom of the molded cup was brought into close contact with a general printed matter, e.g., a newspaper or magazine, and examined as to whether characters of the printed matter could be read through the molded article.

- ◯: Characters can be read through the molded article.
- Δ: Characters cannot be read although perceived.
- X: The molded article is so opaque that the presence of characters is not perceived.

Example 1

Stearyl stearate (the ester of stearic acid with stearyl alcohol) was used as lubricant A, and calcium stearate was used as lubricant B.

First, stearyl stearate, whose melting point is 68° C., was heated to 80° C. to prepare a melt of stearyl stearate. This melt was injected in a continuous polymerization process for polyamide 66 production in the following manner.

A 50% aqueous solution of an AH salt formed from adipic acid and hexamethylenediamine was preliminarily concentrated to 80% and then heated to 250° C. in a polymerizer. The condensation water was removed while maintaining an elevated pressure of 17 atm to thereby convert the salt into a prepolymer. Thereafter, the pressure was reduced to atmospheric pressure and the contents were heated to 280° C. The condensation water was further removed to complete polycondensation. Thus, a polyamide 66 polymer having a sulfuric acid relative viscosity η$_r$ (1 g/100 cc-98% sulfuric acid, at 25° C.) of 2.8 was obtained.

The stearyl stearate melt was injected into an internal part of the discharge line for the molten polyamide 66 polymer with a plunger pump at a rate of 0.1 part by weight per 100 parts by weight of the polymer. The resultant composition was formed into strands, cut, and then dried. Thus, polyamide 66 resin pellets containing the lubricant were produced.

Subsequently, 100 parts by weight of the pellets obtained were blended with 0.1 part by weight of calcium stearate by means of a cone blender to produce polyamide 66 resin pellets having calcium stearate attached to the pellet surface.

The pellets thus produced were subjected to injection molding to evaluate moldability, with respect to releasability and plasticity, and molded-article quality (color tone and transparency). The results obtained are shown in Table 1.

Example 2

Stearyl stearate and calcium montanate were used as lubricant A and lubricant B, respectively.

The lubricants were added in the same manner as in Example 1 to produce polyamide 66 resin pellets. (The stearyl stearate was present inside the pellets, while the calcium montanate was attached to the pellet surface.)

The pellets thus produced were subjected to injection molding to evaluate moldability, with respect to releasability and plasticity, and molded-article quality (color tone and transparency). The results obtained are shown in Table 1.

Example 3

The same procedure as in Example 1 was conducted, except that both stearyl stearate and calcium stearate were added during the polymerization for polyamide 66 production.

First, stearyl stearate was mixed with calcium stearate in an equiweight proportion to prepare a lubricant mixture, which had a melting point of about 160° C. This lubricant mixture was heated to 180° C. to prepare a homogeneous melt. In the same manner as in Example 1, this melt was injected in a polymerization process for polyamide 66 polymer production at a rate of 0.2 parts by weight per 100 parts by weight of the polymer. Thus, polyamide 66 resin pellets containing stearyl stearate and calcium stearate were produced. (The stearyl stearate and the calcium stearate were present inside the pellets).

The pellets thus produced were subjected to injection molding to evaluate moldability, with respect to releasability and plasticity, and molded-article quality (color tone and transparency). The results obtained are shown in Table 1.

Example 4

Stearyl stearate as lubricant A was mixed with monoaluminum stearate as lubricant B in an equiweight proportion to prepare a lubricant mixture, which had a melting point of about 180° C. This lubricant mixture was heated to 200° C. to prepare a homogeneous melt.

In the same manner as in Example 3, this melt was injected in a polymerization process for polyamide 66 polymer production at a rate of 0.2 parts by weight per 100 parts by weight of the polymer. Thus, polyamide 66 resin pellets containing the two lubricants were produced.

The pellets produced were molded and evaluated in the same manner as in Example 1. The results obtained are shown in Table 1.

Example 5

Behenyl behenate (the ester of behenic acid with behenyl alcohol) as lubricant A was mixed with calcium stearate as lubricant B in an equiweight proportion to prepare a lubricant mixture, which had a melting point of about 170° C. This lubricant mixture was heated to 190° C. to prepare a homogeneous melt.

In the same manner as in Example 3, this melt was injected in a polymerization process for polyamide 66 polymer production at a rate of 0.2 parts by weight per 100 parts by weight of the polymer. Thus, polyamide 66 resin pellets containing the two lubricants were produced.

The pellets produced were molded and evaluated in the same manner as in Example 1. The results obtained are shown in Table 1.

Example 6

Stearyl stearate, calcium stearate, and stearamide were used as lubricant A, lubricant B, and lubricant C, respectively. These three lubricants were mixed together in an equiweight proportion to prepare a lubricant mixture, which had a melting point of about 120° C. This lubricant mixture was heated to 140° C. to prepare a homogeneous melt.

In the same manner as in Example 3, this melt was injected in a polymerization process for polyamide 66 polymer production at a rate of 0.3 parts by weight per 100 parts by weight of the polymer. Thus, polyamide 66 resin pellets containing the three lubricants were produced.

The pellets produced were molded and evaluated in the same manner as in Example 1. The results obtained are shown in Table 1.

Example 7

Stearyl stearate, calcium stearate, and erucamide were used as lubricantA, lubricant B, and lubricant C, respectively. These three lubricants were mixed together in an equiweight proportion to prepare a lubricant mixture, which had a melting point of about 100° C. This lubricant mixture was heated to 120° C to prepare a homogeneous melt.

In the same manner as in Example 3, this melt was injected in a polymerization process for polyamide 66 polymer production at a rate of 0.3 parts by weight per 100 parts by weight of the polymer. Thus, polyamide 66 resin pellets containing the three lubricants were produced.

The pellets produced were molded and evaluated in the same manner as in Example 1. The results obtained are shown in Table 1.

Example 8

Stearyl stearate as lubricant A was mixed with stearamide as lubricant C in an equiweight proportion to prepare a lubricant mixture, which had a melting point of about 90° C. This lubricant mixture was heated to 110° C. to prepare a homogeneous melt.

In the same manner as in Example 1, this melt was injected in a polymerization process for polyamide 66 polymer production at a rate of 0.2 parts by weight per 100 parts by weight of the polymer. Thus, polyamide 66 resin pellets containing the two lubricants were produced.

Subsequently, 100 parts by weight of the pellets obtained were blended with 0.1 part by weight of calcium stearate as lubricant B by means of a cone blender to produce polyamide 66 resin pellets having calcium stearate attached to the pellet surface.

The pellets produced were molded and evaluated in the same manner as in Example 1. The results obtained are shown in Table 1.

Example 9

A hundred parts by weight of the pellets obtained in Example 6 (the three lubricants were present inside the pellets) were blended with 0.1 part by weight of calcium montanate as another lubricant B by means of a cone blender to produce polyamide 66 resin pellets having calcium montanate attached to the pellet surface.

The pellets produced were molded and evaluated in the same manner as in Example 1. The results obtained are shown in Table 1.

Example 10

The pellets obtained in Example 3 (the two lubricants were present inside the pellets) were treated in the same manner as in Example 9 to produce polyamide 66 resin pellets having 0.1 part by weight of calcium montanate, as another lubricant B, attached to the pellet surface.

The pellets produced were molded and evaluated in the same manner as in Example 1. The results obtained are shown in Table 1.

Example 11

Polymerization for producing polyamide 66 was conducted in the same manner as in Example 1, except that sodium hypophosphite as an antioxidant, acetic acid as a polymerization degree regulator, and hexamethylenediamine were added to the 50% aqueous AH salt solution in amounts of 0.01 part by weight, 0.06 parts by weight, and 0.06 parts by weight, respectively, per 100 parts by weight of the polymer to be yielded.

Two lubricants were added in the same manner as in Example 1. Namely, stearyl stearate was injected during polymerization and calcium stearate was added to the pellet surface. (The stearyl stearate was present inside the pellets, while the calcium stearate was attached to the pellet surface.)

The pellets produced were molded and evaluated in the same manner as in Example 1. The results obtained are shown in Table 1.

Example 12

Polymerization for producing polyamide 66 was conducted in the same manner as in Example 9, except that copper iodide and potassium iodide were added to the 50% aqueous AH salt solution in amounts of 0.03 parts by weight and 0.5 parts by weight, respectively, per 100 parts by weight of the polymer to be yielded.

Four lubricants were added in the same manner as in Example 9.

The pellets produced were molded and evaluated in the same manner as in Example 1. The results obtained are shown in Table 1.

Comparative Example 1

Polymerization for polyamide 66 production only was conducted in the same manner as in Example 1 without adding any lubricant. Thus, polyamide 66 resin pellets were obtained. (These pellets had no lubricants in inner parts thereof or on the surface thereof.)

A hundred parts by weight of these pellets were blended with 0.1 part by weight of stearyl stearate as lubricant A and 0.1 part by weight of calcium stearate as lubricant B by means of a cone blender to produce polyamide 66 resin pellets having the two lubricants attached to the pellet surface. (All the stearyl stearate and calcium stearate were attached to the pellet surface.)

The pellets produced were molded and evaluated in the same manner as in Example 1. The results obtained are shown in Table 1.

Comparative Example 2

Polymerization for polyamide 66 production only was conducted in the same manner as in Example 1 without adding any lubricant. Thus, polyamide 66 resin pellets were obtained. (These pellets had no lubricants in inner parts thereof or on the surface thereof.)

As a lubricant was used Hoechst Wax OP, manufactured by Hoechst A. G. This lubricant is a wax which is obtained by partially esterifying montanic acid with butylene glycol and partially saponifying the remaining acid with calcium hydroxide and comprises two components, i.e., a higher fatty acid ester (the alcohol ingredient is a lower dihydric alcohol) and a higher fatty acid metal salt.

A hundred parts by weight of the pellets were blended with 0.2 parts by weight of Hoechst Wax OP by means of a cone blender. Subsequently, these pellets were treated with an extruder (TEM 35, manufactured by Toshiba Machine Co., Ltd.) to melt them again at 280° C. and knead the polyamide resin together with the lubricant. This polyamide composition was formed into strands by extrusion through orifices, and the strands were cut to produce polyamide 66 resin pellets containing the lubricant.

The pellets produced were molded and evaluated in the same manner as in Example 1. The results obtained are shown in Table 1.

Comparative Example 3

In the same manner as in Example 1, polyamide 66 resin pellets were produced through polymerization for polyamide production during which stearyl stearate only was injected as lubricant A. In this polymerization process for polyamide 66 production, the stearyl stearate was used at a rate of 0.3 parts by weight per 100 parts by weight of the polyamide. (The stearyl stearate was present as the only lubricant inside the pellets, and no lubricants were attached to the pellet surface.)

The pellets produced were molded and evaluated in the same manner as in Example 1. The results obtained are shown in Table 1.

Comparative Example 4

Polyamide 66 resin pellets were produced in the same manner as in Example 3, except that calcium stearate as lubricant B was injected as the only lubricant during the polymerization for polyamide production. In this polymerization process for polyamide 66 production, the calcium stearate was used at a rate of 0.3 parts by weight per 100 parts by weight of the polyamide. (The calcium stearate was present as the only lubricant inside the pellets, and no lubricants were attached to the pellet surface.)

The pellets produced were molded and evaluated in the same manner as in Example 1. The results obtained are shown in Table 1.

Example 13

During a continuous polymerization process for polyamide 6 production, lubricants were incorporated in the same manner as in Example 9.

First, a melt of the lubricant mixture was prepared which was composed of three lubricants, i.e., stearyl stearate, calcium stearate, and stearamide.

ε-Caprolactam was dissolved in methanol, and water and a polymerization degree regulator were added thereto. The resultant mixture was heated to 260° C. in a polymerization column at ordinary pressure and reacted for 10 hours. As a result, a polyamide 6 polymer having a sulfuric acid relative viscosity $\eta_r$ of 2.4 was obtained. The lubricant melt was injected into an internal part of the discharge line for the molten polyamide 6 polymer with a plunger pump at a rate of 0.3 parts by weight per 100 parts by weight of the polymer. The resultant composition was formed into strands and cut into pellets. Subsequently, the pellets were washed with hot water to extract and remove the unreacted oligomer, and then dried. Thus, polyamide 6 resin pellets containing the three lubricants were produced.

Furthermore, 0.1 part by weight of calcium montanate was attached to the surface of the thus-obtained pellets to produce polyamide 6 resin pellets.

The pellets produced were molded and evaluated in the same manner as in Example 1. The results obtained are shown in Table 1. However, in the injection molding, some of the conditions were changed as shown below.

Injection time: 15 sec

Cooling time: 40 sec

Set cylinder temperature in the evaluation of plasticity: 300° C. for high-temperature evaluation or 250° C. for low-temperature evaluation.

Comparative Example 5

Polymerization for polyamide 6 production only was conducted in the same manner as in Example 14 without adding any lubricant. Thus, polyamide 6 resin pellets were obtained. (These pellets had no lubricants in inner parts thereof or on the surface thereof.)

These pellets were treated in the same manner as in Comparative Example 1 to produce polyamide 6 resin pellets having stearyl stearate and calcium stearate both attached to the pellet surface.

The pellets produced were molded and evaluated in the same manner as in Example 14. The results obtained are shown in Table 1.

Example 14

During a batch polymerization process for polyamide 66/6I production, lubricants were incorporated in the same manner as in Example 13.

First, 100 parts by weight of a 50% aqueous solution of an AH salt formed from adipic acid and hexamethylenediamine was mixed with 5 parts by weight of hexamethylenediamine and 7 parts by weight of isophthalic acid. This mixture was preliminarily concentrated to 80% and then heated to 250° C. in a polymerizer. The condensation water was removed while maintaining an elevated pressure of 17 atm to thereby convert the salt into a prepolymer. Thereafter, the pressure was reduced to atmospheric pressure and the contents were heated to 280° C. The condensation water was further removed to complete polycondensation. Thus, a polyamide 66/6I copolymer was obtained which had a polyamide 66/polyamide 6I ratio of 8/2 and a sulfuric acid relative viscosity $\eta_r$ of 2.3.

A melt of the three-lubricant mixture was injected into an internal part of the discharge line for the molten polymer with a plunger pump at a rate of 0.3 parts by weight per 100 parts by weight of the polymer. The resultant composition was formed into strands, cut, and then dried. Thus, polyamide 66/6I resin pellets containing the three lubricants were produced.

Furthermore, 0.1 part by weight of calcium montanate was attached to the surface of the thus-obtained pellets to produce polyamide 66/6I resin pellets.

The pellets produced were molded and evaluated in the same manner as in Example 1. The results obtained are shown in Table 1. However, in the injection molding, some of the conditions were changed as shown below.

Injection time: 20 sec

Cooling time: 60 sec

Set cylinder temperature in the evaluation of plasticity: 300° C. for high-temperature evaluation or 250° C. for low-temperature evaluation.

Comparative Example 6

Polymerization for polyamide 66/6I production only was conducted in the same manner as in Example 15 without adding any lubricant. Thus, polyamide 66/6I resin pellets were obtained. (These pellets had no lubricants in inner parts thereof or on the surface thereof.)

These pellets were treated in the same manner as in Comparative Example 1 to produce polyamide 66/6I resin pellets having stearyl stearate and calcium stearate both attached to the pellet surface.

The pellets produced were molded and evaluated in the same manner as in Example 15. The results obtained are shown in Table 1.

TABLE 1

| | | Lubricants added | | | | Release force | | | | Time for plasticization | | Quality of molded article | |
| | | Lubricant A | | Lubricant C | | Mold temperature 100° C. | | Mold temperature 30° C. | | High temperature | Low temperature | | |
| | Kind of polyamide | Amount Addition method | Lubricant B Amount Addition method | Amount Addition method | Other additive | Average (kgf) | Fluctuation (kgf) | Average (kgf) | Fluctuation (kgf) | Time (sec) | Time (sec) | Color tone, (b value) | Transparency |
|---|---|---|---|---|---|---|---|---|---|---|---|---|---|
| Ex. 1 | PA66 100 parts | ST-ST 0.1 part in polymerization | ST-Ca 0.1 part blending | — 0 part | — 0 part | — | 90 | 10 | 120 | 10 | 12 | 15 | −2 | Δ |
| Ex. 2 | PA66 100 parts | ST-ST 0.1 part in polymerization | MO-Ca 0.1 part blending | — 0 part | — 0 part | — | 70 | 10 | 100 | 10 | 10 | 11 | −2 | Δ |
| Ex. 3 | PA66 100 parts | ST-ST 0.1 part in polymerization | ST-Ca 0.1 part in polymerization | — 0 part | — 0 part | — | 80 | 5 | 120 | 10 | 10 | 14 | −2 | Δ |
| Ex. 4 | PA66 100 parts | ST-ST 0.1 part in polymerization | ST-Al 0.1 part in polymerization | — 0 part | — 0 part | — | 80 | 5 | 120 | 10 | 11 | 13 | −2 | Δ |
| Ex. 5 | PA66 100 parts | BE-BE 0.1 part in polymerization | ST-Ca 0.1 part in polymerization | — 0 part | — 0 part | — | 80 | 5 | 130 | 10 | 11 | 14 | −1 | Δ |
| Ex. 6 | PA66 100 parts | ST-ST 0.1 part in polymerization | ST-Ca 0.1 part in polymerization | — 0 part | ST-AM 0.1 part in polymerization | — | 70 | 5 | 110 | 10 | 10 | 13 | −2 | ◯ |
| Ex. 7 | PA66 100 parts | ST-ST 0.1 part in polymerization | ST-Ca 0.1 part in polymerization | — 0 part | ER-AM 0.1 part in polymerization | — | 70 | 5 | 110 | 10 | 10 | 14 | 0 | ◯ |
| Ex. 8 | PA66 100 parts | ST-ST 0.1 part in polymertzation | ST-Ca 0.1 part blending | — 0 part | ST-AM 0.1 part in polymerization | — | 70 | 10 | 110 | 10 | 11 | 14 | −2 | ◯ |
| Ex. 9 | PA66 100 parts | ST-ST 0.1 part in polymerization | ST-Ca 0.1 part in polymerization | MO-Ca 0.1 part blending | ST-AM 0.1 part in polymerization | — | 50 | 5 | 80 | 5 | 10 | 9 | −2 | ◯ |

TABLE 1-continued

| | Kind of poly-amide | Lubricants added | | | | Other additive | Release force | | | | Time for plasticization | | Quality of molded article | |
|---|---|---|---|---|---|---|---|---|---|---|---|---|---|---|
| | | Lubricant A Amount Addition method | Lubricant B Amount Addition method | Lubricant C Amount Addition method | | | Mold temperature 100° C. | | Mold temperature 30° C. | | High temperature Time (sec) | Low temperature Time (sec) | Color tone, (b value) | Transparency |
| | | | | | | | Average (kgf) | Fluctuation (kgf) | Average (kgf) | Fluctuation (kgf) | | | | |
| Ex. 10 | PA66 100 parts | ST-ST 0.1 part in polymerization | ST-Ca 0.1 part in polymerization | MO-Ca 0.1 part blending | — 0 part | — | 60 | 6 | 90 | 5 | 10 | 9 | -2 | Δ |
| Ex. 11 | PA66 100 parts | ST-ST 0.1 part in polymerization | ST-Ca 0.1 part blending | — 0 part | — 0 part | P* | 90 | 10 | 120 | 10 | 11 | 14 | -4 | ○ |
| Ex. 12 | PA66 100 parts | ST-ST 0.1 part in polymerization | ST-Ca 0.1 part in polymerization | MO-Ca 0.1 part blending | ST-AM 0.1 part in polymerization | Cu* | 50 | 5 | 80 | 5 | 10 | 9 | 0 | ○ |
| Com. Ex. 1 | PA66 100 parts | ST-ST 0.1 part blending | ST-Ca 0.1 part blending | — 0 part | — 0 part | — | 100 | 20 | 130 | 20 | 16 | 15 | -2 | Δ |
| Com. Ex. 2 | PA66 100 parts | HW-OP 0.1 parts kneading | — | — 0 part | — 0 part | — | 170 | 10 | 110 | 10 | 11 | 14 | +7 | Δ |
| Com. Ex. 3 | PA66 100 parts | ST-ST 0.3 part in polymerization | — 0 part | — 0 part | — 0 part | — | 200 | 40 | 150 | 40 | 14 | 16 | -1 | Δ |
| Com. Ex. 4 | PA66 100 parts | — 0 part — | ST-Ca 0.3 parts in polymerizaton | — 0 part | — 0 part | — | 150 | 40 | 300 | 40 | 15 | 15 | -1 | X |
| Ex. 13 | PA6 100 parts | ST-ST 0.1 part in polymerization | ST-Ca 0.1 part in polymerizaton | MO-Ca 0.1 part blending | ST-AM 0.1 part in polymerization | — | 160 | 10 | 180 | 10 | 12 | 11 | -5 | ○ |
| Com. Ex. 5 | PA6 100 parts | ST-ST 0.1 part blending | ST-Ca 0.1 part blending | — 0 part | — 0 part | — | 230 | 40 | 240 | 40 | 17 | 14 | -5 | Δ |
| Ex. 14 | PA66/6I 100 parts | ST-ST 0.1 part in polymerization | ST-Ca 0.1.part in polymerization | MO-Ca 0.1 part blending | ST-AM 0.1 part in polymerization | — | 220 | 10 | 280 | 10 | 14 | 13 | +1 | ○ |
| Com. Ex. 6 | PA66/6I 100 parts | ST-ST 0.1 part blending | ST-Ca 0.1 part blending | — 0 part | — 0 part | — | 300 | 40 | 350 | 40 | 19 | 16 | +1 | Δ |

The abbreviations used in Table 1 are as follows.
PA66: polyamide 66
PA6: polyamide 6
PA66/6I: copolymer of polyamide 66 and polyamide 6I
ST-ST: stearyl stearate
BE-BE: behenyl behenate
ST-Ca: calcium stearate
ST-Al: monoaluminum stearate
ST-AM: stearamide
ER-AM: erucamide
MO-Ca: calcium montanate
HW-OP: Hoechst Wax OP
P*: sodium hypophosphite+acetic acid+hexamethylenediamine
Cu*: copper iodide+potassium iodide
In polymerization: addition as melt in polymerization process for polyamide production
Blending: adhesion to pellet surface
Kneading: melt-mixing of polyamide resin with lubricant by means of extruder As compared to conventional polyamide pellets, the polyamide resin composition pellets of, the invention are excellent in releasability and plasticity in injection molding under a wide range of molding conditions and stably show these performances. Therefore, the time required for each molding cycle can be considerably reduced and productivity can be greatly increased. Furthermore, the pellets give molded articles which have excellent appearance quality concerning color tone and transparency and can have a high added value.

While the present invention has been described in detail and with reference to specific examples thereof, it will be apparent to one skilled in the art that various changes and modifications can be made therein without departing from the spirit and scope thereof.

What is claimed is:
1. Polyamide resin pellets which comprise:
   100 parts by weight of a polyamide resin;
   from 0.01 to 1.0 part by weight of lubricant A, which comprises at least one ester of a higher aliphatic carboxylic acid wherein said higher aliphatic carboxy- lic acid has from 6 to 30 carbon atoms with a higher alcohol which has from 6 to 30 carbon atoms; and from 0.01 to 1.0 part by weight of lubricant B, which comprises at least one higher aliphatic carboxylic acid metal salt, wherein said lubricant A is present inside the pellets.

2. The polyamide resin pellets of claim 1, wherein said lubricant B is a metal salt of a higher aliphatic carboxylic acid having 26 to 30 carbon atoms.

3. The polyamide resin pellets of claim 2, wherein lubricant B is attached to the surface of the pellets.

4. The polyamide resin pellets of claim 1, wherein said lubricant B comprises at least two higher aliphatic carboxylic acid metal salts, at least one of which is attached to the surface of the pellets.

5. Polyamide resin pellets which comprise:

100 parts by weight of a polyamide resin;

from 0.01 to 1.0 part by weight of lubricant A, which comprises at least one ester of a higher aliphatic carboxylic acid wherein said higher aliphatic carboxylic acid has from 6 to 30 carbon atoms with a higher alcohol which has from 6 to 30 carbon atoms;

from 0.01 to 1.0 part by weight of lubricant B, which comprises at least one higher aliphatic carboxylic acid metal salt wherein said higher aliphatic carboxylic acid metal salt has from 6 to 30 carbon atoms; and from 0.01 to 1.0 part by weight of lubricant C, which comprises a higher aliphatic carboxylic acid amide which has from 6 to 30 carbon atoms, wherein said lubricant A is present inside the pellets.

6. The polyamide resin pellets of claim 5, wherein said lubricant B comprises at least two higher aliphatic carboxylic acid metal salts, at least one of which is attached to the surface of the pellets.

7. The polyamide resin pellets of claim 5, wherein said lubricant A is an ester of an aliphatic carboxylic acid having 15 to 21 carbon atoms.

8. The polyamide resin pellets of claim 6, wherein said lubricant A is an ester of an aliphatic carboxylic acid having 15 to 21 carbon atoms.

9. The polyamide resin pellets of claim 5, wherein said lubricant C is a saturated fatty acid amide.

10. The polyamide resin pellets of claim 6, wherein said lubricant C is a saturated fatty acid amide.

11. The polyamide resin pellets of claim 7, wherein said lubricant C is a saturated fatty acid amide.

12. The polyamide resin pellets of claim 6, wherein said lubricant B that is attached to the pellet surface is a metal salt of a higher fatty acid having 15 to 30 carbon atoms.

13. The polyamide resin pellets of claim 8, wherein said lubricant B that is attached to the pellet surface is a metal salt of a higher fatty acid having 15 to 30 carbon atoms.

14. The polyamide resin pellets of claim 13, wherein said lubricant C is a saturated fatty acid amide.

* * * * *